Figure 1:
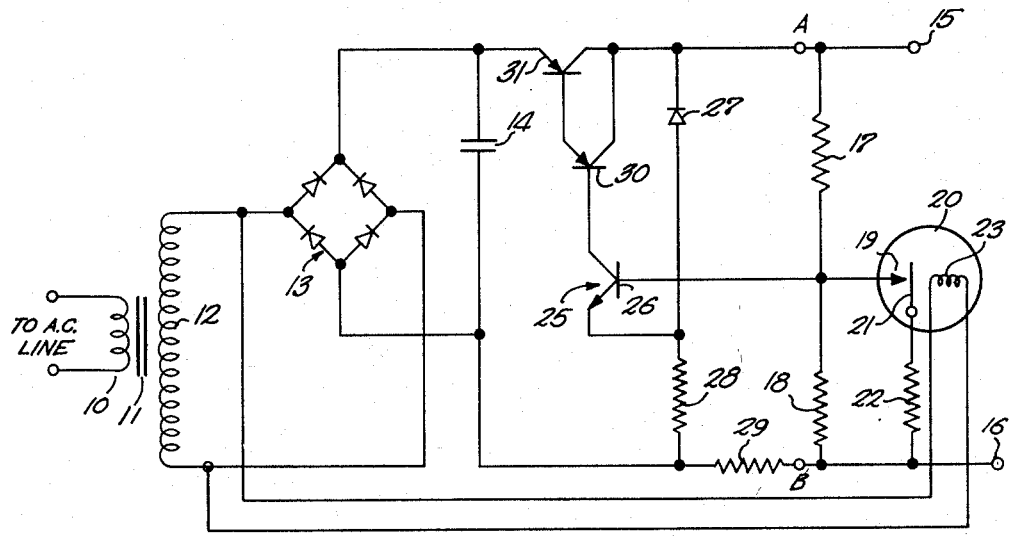

April 7, 1964

L. W. ERATH 3,128,132

SOURCE OF COMBINED ALTERNATING CURRENT
AND DIRECT CURRENT VOLTAGE
Filed Jan. 24, 1962

INVENTOR
*Louis W. Erath*

BY *Irons, Birch, Swindler & McKie*
ATTORNEYS

United States Patent Office 3,128,132
Patented Apr. 7, 1964

3,128,132
SOURCE OF COMBINED ALTERNATING CURRENT AND DIRECT CURRENT VOLTAGE
Louis W. Erath, Houston, Tex., assignor to Test Equipment Corporation, Harris County, Tex., a corporation of Texas
Filed Jan. 24, 1962, Ser. No. 168,435
2 Claims. (Cl. 307—2)

This invention relates to a voltage source, and, more particularly, to a source of a known amplitude alternating current voltage superimposed on a known amplitude direct current voltage.

For many reasons, particularly in testing functions, it is desirable to have available a source of direct current voltage upon which is superimposed an alternating current voltage, both of which are of known and controlled amplitude. Such a source is usable particularly in connection with the testing of the dynamic characteristics of transistors. For such purposes, especially since the collector currents of transistors arranged for measurement of the forward current transfer ratio vary widely, it is necessary that the source of combined alternating current and direct current voltage be of extremely low internal impedance so that the source need not be adjusted each time a different type of transistor is to be tested. The apparatus of the present invention is designed to provide a source of low impedance, which source supplies both a relatively large amplitude D.-C. voltage and a small amplitude superimposed A.-C. voltage.

The apparatus of the present invention, generally speaking, includes a suitable source of direct current voltage which includes an impedance across which the voltage is developed, together with means for cyclically varying that impedance. Such cyclic variation of course provides an A.-C. superimposed voltage on the direct current output of the source.

In a preferred embodiment of the invention the output of the direct current source is developed across a pair of series connected resistors and one of those resistors is shunted by the series combination of a switch and a third resistor. The switch is cyclically opened and closed to, in effect, reduce the resistance of the shunt path across the source output. The switch may appropriately be a vibrator or chopper, but it also may be a transistor.

In the invention, it is preferred, though not essential, that the direct current source consist of a rectifier driven from the usual A.-C. lines and provided with a regulator which is preferably of the transistor type, with a series resistance whose value may be selected to make the output impedance of the source extremely low or even negative. Also, the output voltage is appropriately referred to a Zener diode which is connected across the source output.

The invention will now be more fully described in conjunction with a drawing showing preferred embodiments thereof.

Figure 2:
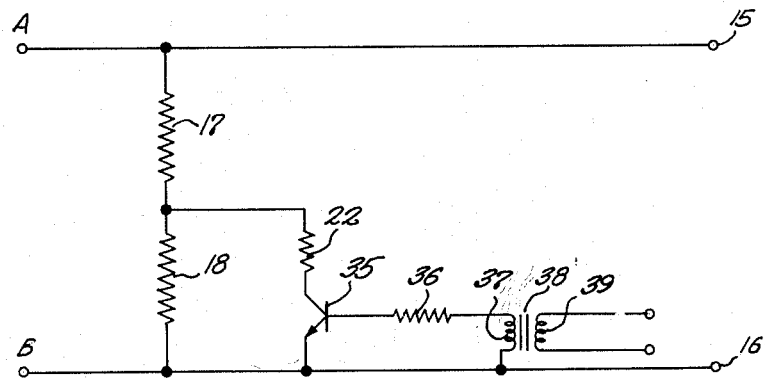

In the drawing,

FIG. 1 is a schematic diagram of one form of the invention embodying a vibrator for cyclically varying the impedance shunted across the output terminals; and FIG. 2 is a schematic diagram of an alternative form of switch, in this case a transistor.

Referring first to FIG. 1, the usual A.-C. line is shown as connected to the primary 10 of a power transformer 11. The secondary 12 of the transformer is connected to two junctions of a diode bridge rectifier generally indicated at 13. The other two junctions of the rectifier 13 are appropriately connected together by a capacitor 14, functioning as a filter. The output of the rectifier-filter combination is developed across output terminals 15 and 16 which are connected together by series connected resistors 17 and 18. The junction between the two resistors is connected to the movable contact 19 of a vibrator or chopper 20. The movable contact 21 of the vibrator is connected through a resistor 22 to the output terminals 16, which in turn is directly connected to one of the output junctions of the rectifier 13.

The coil 23 of the vibrator is supplied with alternating current voltage, preferably by direct connection across the secondary winding 12 of the power transformer.

Each time that contact is made between movable contact 21 and stationary contact 19 of the vibrator, the resistor 18 is shunted by the resistor 22 so that the equivalent resistance shunted across the output terminals 15 and 16 is reduced. Then, when the contacts are disengaged, the output resistance is increased. As a result, the output voltage across the terminals 15 and 16 varies at the frequency of the alternating current line and with an amplitude determined by the values of the several resistors.

In order that the direct current voltage may be controlled, a transistor regulator generally indicated at 25 is provided. That regulator consists of an NPN transistor 26 which has its base connected to the junction between resistors 17 and 18 and its emitter connected to the junction between a Zener diode 27 and a resistor 28. The resistor 28 is connected through a resistor 29 to the output terminal 16, and also to one output junction of the rectifier 13. The remote terminal of Zener diode 27 is connected to the output terminal 15.

The collector of transistor 26 is connected to the base of a PNP transistor 30, while the collector of transistor 30 is connected to the output terminal 15 and the emitter of the transistor is connected to the base of another PNP transistor 31. The emitter of transistor 31 is connected to the other output junction of rectifier 13 while the collector is connected to output terminal 15.

With the apparatus of FIG. 1, as indicated above, a direct current voltage is supplied across terminals 15 and 16 with an alternating current voltage superimposed thereupon. As an instance of operation of this equipment, the components may be selected to provide voltage which varies between 14 and 15 volts at power line frequency. Both voltages are referred to the Zener diode 27, and the output voltages are both controlled by the transistor regulator 25. By appropriate selection of the resistance of resistor 29, the output impedance can be reduced to zero or even to some negative value.

The apparatus of FIG. 1 employs a vibrator or chopper as the switch for controlling the impedance shunted across the output terminals. In FIG. 2 there is shown an alternative apparatus which substitutes a transistor switch for the vibrator. In FIG. 2 is shown only the alternative switch and the immediate cooperating elements, connected across terminals A and B of FIGURE 1. The NPN transistor 35 has its collector connected through resistor 22 to the junction between resistors 17 and 18 and its emitter connected to the junction between resistor 18 and output terminal 16. The base of the transistor is connected through an appropriate voltage dropping resistor 36 to one terminal of the secondary 37 of an alternating current transformer 38. The primary 39 of the transformer is supplied with alternating current from any appropriate source, such as the secondary 12 of the power transformer.

The transistor and the other components of the apparatus of FIG. 2 may be selected such that the transistor is driven from its saturation state to its non-conduction state by the alternating current supplied between its base and emitter. Then, the transistor merely functions as a switch to alternately connect and disconnect resistor 22 across resistor 18. The apparatus of FIG. 2 then operates in the same manner as that of FIG. 1.

It will be obvious that many minor changes could be made in the apparatus specifically described in conjunction with the preferred embodiments of the invention. In particular, there is nothing critical about the rectifier which is illustrated in FIG. 1, and the particular transistor regulator also shown in that figure is not essential to operation of the invention. Accordingly, it will be understood that the invention is not limited to the embodiments illustrated, but rather only by the scope of the appended claims.

I claim:

1. Low impedance apparatus for providing a known amplitude alternating current voltage superimposed on a known amplitude direct current voltage comprising
   an alternating current source,
   rectifier means supplied with voltage from said source and operable to supply a direct current voltage across its output,
   the series combination of three resistors connected across said output;
   said apparatus having a pair of output terminals with one connected to the junction between a first and a second of said resistors and the other connected to the junction between the third resistor and said rectifier means,
   a Zener diode connected across said rectifier means,
   a fourth resistor,
   and a switch operable when supplied with an alternating current voltage to cyclically connect said fourth resistor across said third resistor, said switch being connected to said alternating current source to receive voltage therefrom.

2. The apparatus of claim 1 including
   a transistor regulator comprising three transistors,
   a fifth resistor connected between said Zener diode and the junction between said rectifier means and said third resistor,
   a first one of said transistors having its base connected to the junction between said second and third resistors, its emitter connected to the junction between said fifth resistor and said Zener diode, and its collector connected to the base of a second one of said transistors,
   said second transistor having its collector connected to the collector of the third transistor and its emitter connected to the base of the third transistor,
   said third transistor having its emitter and collector electrodes connected between said first resistor and said rectifier means,
   said second and third transistors being of opposite conductivity type to said first transistor.

References Cited in the file of this patent

UNITED STATES PATENTS 2,936,404     Simone  ---------------  May 10, 1960